No. 714,903. Patented Dec. 2, 1902.
J. T. HINDS.
PROCESS OF LINING PIPES.
(Application filed Feb. 17, 1898. Renewed Mar. 24, 1902.)
(No Model.) 2 Sheets—Sheet 1.
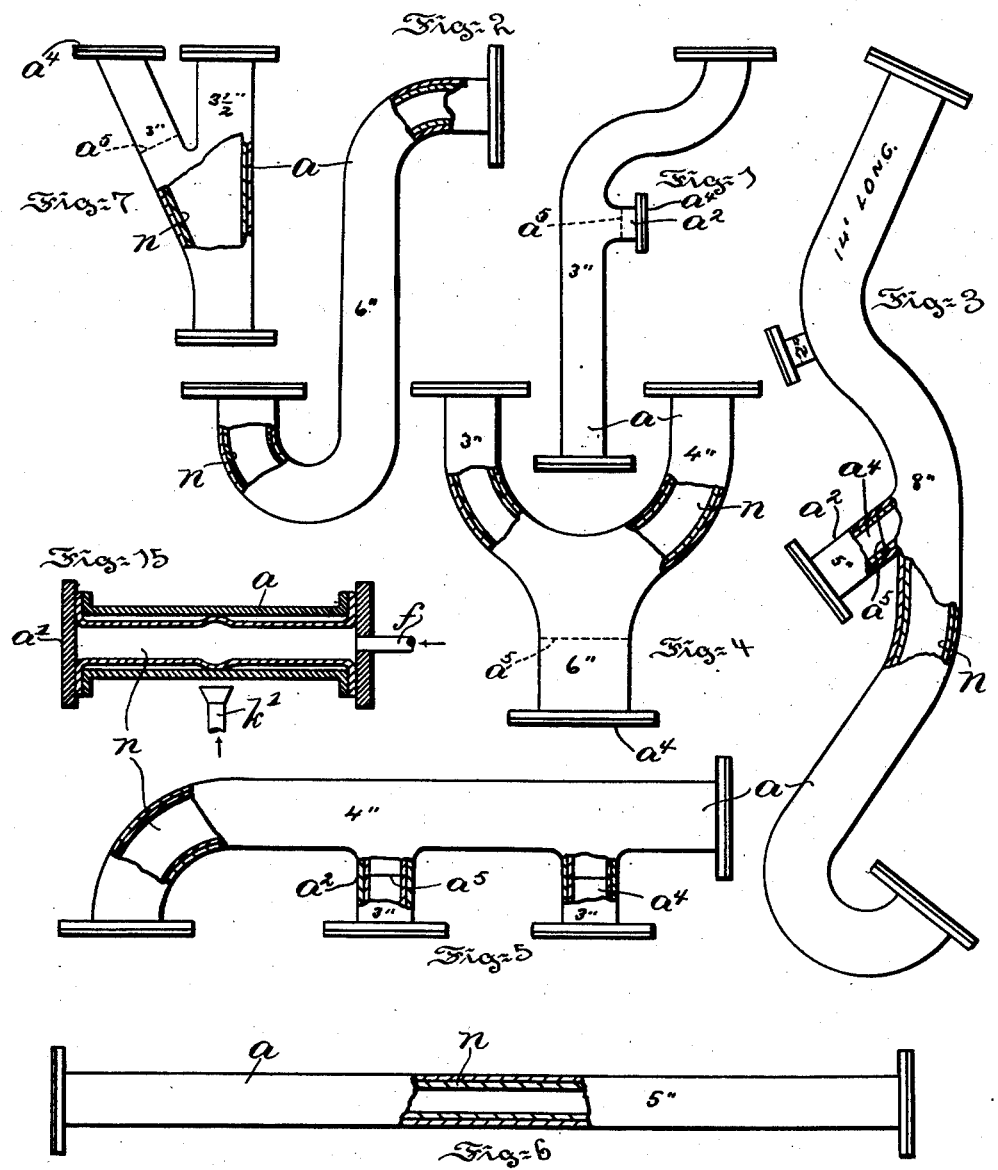
WITNESSES:
INVENTOR
BY
ATTORNEY.

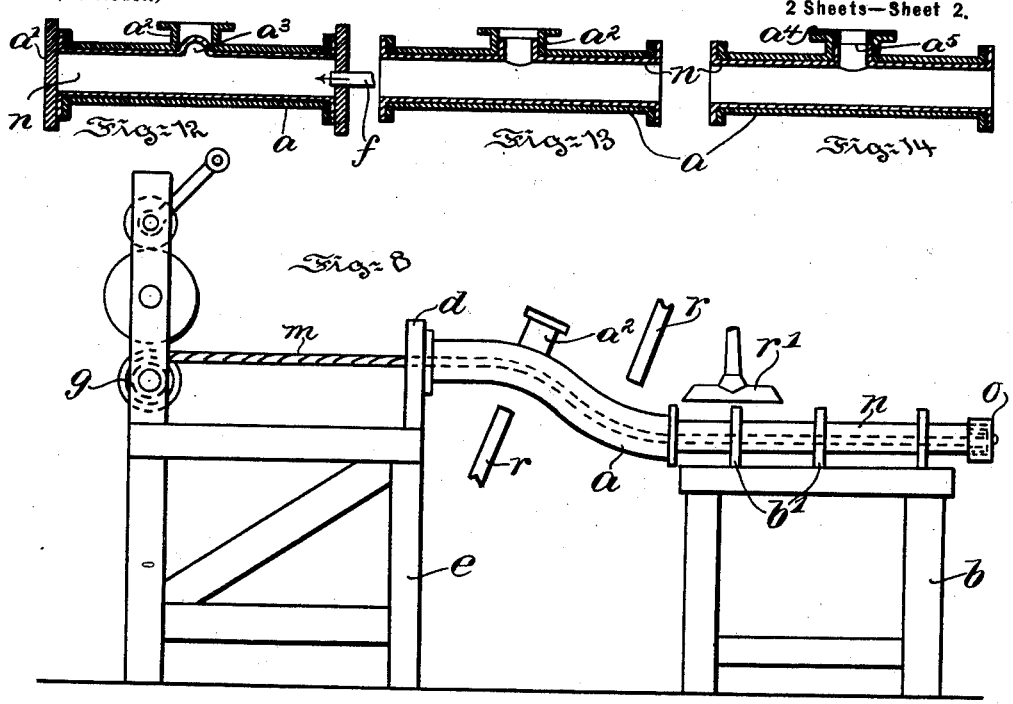
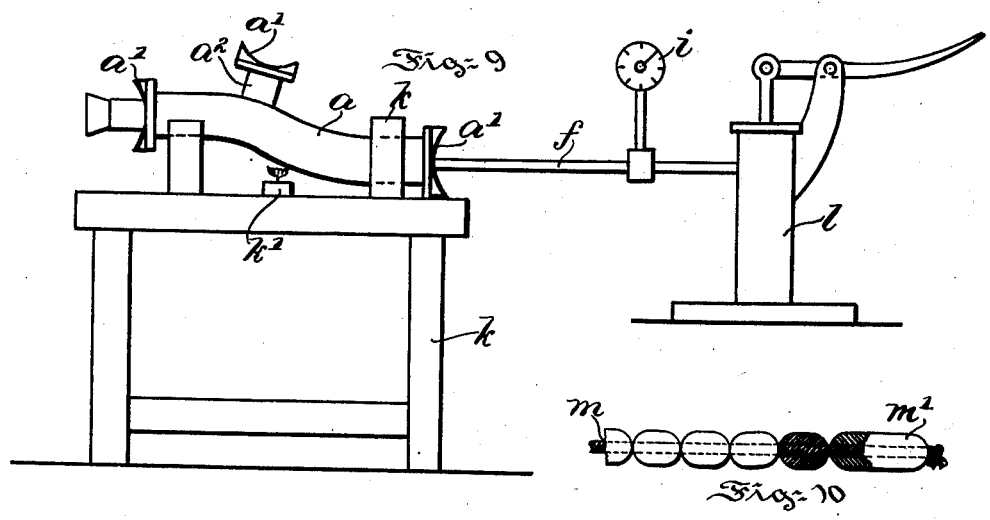

UNITED STATES PATENT OFFICE.

JOHN T. HINDS, OF BROOKLYN, NEW YORK, ASSIGNOR OF ONE-SIXTH TO ROBERT LEWIS, OF BRIDESBURG, PHILADELPHIA, PENNSYLVANIA.

PROCESS OF LINING PIPES.

SPECIFICATION forming part of Letters Patent No. 714,903, dated December 2, 1902.

Application filed February 17, 1898. Renewed March 24, 1902. Serial No. 99,661. (No specimens.)

*To all whom it may concern:*

Be it known that I, JOHN T. HINDS, a citizen of the United States, residing at Brooklyn, in the borough of Queens and State of New York, have invented certain new and useful Improvements in Lining Pipes and the Like, of which the following is a specification.

Objects of the invention are to line pipes of any shape, however irregular, with soft metal in such a way that a tight and perfect fit is insured between the pipe and its lining and in such a way that the lining may be of comparatively great thickness and may be reinforced or made of increased thickness, if desired, at any point or points along the pipe, and, further, to carry the lining unbroken and without joints around, past, or through the union of branches with the main pipe.

Other objects of the invention will be understood from the following description.

Generally stated, the invention comprises the proper application and arrangement of the lining by the regulated application of heat so as to adapt it to the purpose, and also the application of pressure to the lining thus prepared, all as is hereinafter more fully described, and pointed out in the claims.

The nature, characteristic features, and scope of my invention will be more fully understood from the following description, taken in connection with the accompanying drawings, forming part hereof, and in which—

Figures 1 to 7, inclusive, represent views of a number of differently-shaped pipes to which I have applied my invention, although I may apply my invention to any form other than those shown. Fig. 8 is a side elevational view illustrative of my invention. Fig. 9 is a similar view, also illustrative of my invention. Figs. 10 and 11 are respectively side and sectional views of parts adapted for use in connection with the mechanism shown in Fig. 8, and Figs. 12, 13, 14, and 15 are views to which reference will be hereinafter made.

Upon Figs. 1 to 7, inclusive, I have indicated in inches the diameter of the several parts, branches, &c., so as to enable those skilled in the art to clearly comprehend the capabilities of my invention. In order to line a pipe with block-tin, lead, or other comparatively soft metal, as copper, brass, and alloys, I proceed in the manner hereinafter described, and for the sake of clearness and explanation I have referred more particularly to the lining, in accordance with my invention, of a curved and branched pipe with lead and shall point out wherein my invention is applicable to the lining of a straight pipe. The pipe, jacket, or casing $a$ which is to be lined is supported and firmly held in such position that one—for example, the left-hand—end abuts upon a suitable die block or support.

Referring to Fig. 8, $d$ indicates such a die block or support secured to or mounted on one end of a rigidly-constructed table $e$. Upon the opposite end of the table $e$ is mounted a windlass $g$, arranged for the application of considerable power. Connected with the windlass $g$ is a drag-rope or other suitable strong flexible connection $m$. The lining-pipe or tubular lining $n$ designed to enter the pipe $a$ is mounted in suitable guides $b'$, carried by the table $b$ and arranged in such manner that the pipe $n$ can slip through them. The left-hand end of the lining-pipe $n$ enters the right-hand end of the pipe $a$. The drag-rope $m$ passes from the windlass $g$ through both pipes $a$ and $n$ and is connected with a suitable cap $o$ or other device arranged to snugly fit both the inside and outside of the right-hand end of the pipe $n$. The right-hand end of the pipe $n$ is preferably kept at a comparatively low temperature, so that it shall possess considerable rigidity in order to withstand the strain exerted upon it by the rope and windlass in order to force the left-hand end of the pipe $n$ into the pipe $a$. In order to guard against buckling or collapsing of the soft-metal pipe $n$ at the bends or curves of the pipe $a$, I apply heat—for example, by means of a device $r$—which serves not only to somewhat expand the shell $a$, but also to soften and render pliable the pipe $n$ and in general to assist in the passage of the inner soft-metal pipe around the bends or curves. To further assist in the passage of the inner tube into the outer one, I may treat the left-hand portion of the inner tube to the action of heat— for example, by means such as the burner $r'$— which heat will increase its flexibility. Of course care is required in the application of heat in the manner described, as it is not desirable to fuse the interior pipe or lining. The requisite degree of heat will depend upon the thickness of the lining and on the thickness and character of the curvature of the outside pipe and should be sufficient to render the passage of the lining around the bends in the manner described. I have attained good results by using an inner tube or lining of approximately a quarter of an inch less diameter than the internal diameter of the outer pipe or jacket, although pipes of different relative diameters may be employed without departing from the spirit of the invention.

Referring to Figs. 10 and 11, the drag-rope is shown to be of generally oval cross-section and to consist of a number of bodies strung upon a suitable cord. Such a rope is well adapted to the practice of my invention, although it may be replaced by other kinds of ropes when required. In using a rope of the kind described I construct it of such diameter as will be appropriate to the lining, and I find that it operates as a guard to prevent undue buckling and bending of the lining-tube. I may use a lining-tube of such length that when the cap $o$ abuts on the right-hand end of the pipe $a$ the lining-tube extends beyond the left-hand end of the pipe $a$. The portion of the lining-tube that extends beyond the left-hand end of the pipe $a$ may be expanded and caused to bear on the face of the flange, and the portion of the lining-pipe that was inclosed in the cap $o$ may be similarly expanded and used to cover the flange on the right-hand end of the pipe $a$. Of course mechanical power may be substituted for the hand-windlass shown in cases where it is desired to line pipes of comparatively large diameter or to employ linings of comparatively great thickness.

From the foregoing description it is apparent that the lining is drawn into the pipe by means of the windlass, the operation being facilitated where necessary by the regulated application of heat. Clearly a second lining may be drawn into the first lining in a similar manner, and this second lining may be made to extend either throughout the length of the pipe $a$ or throughout any desired portion thereof. Upon the completion of the described operation the pipe $a$ is suitably supported—for example, by means of supports, as $k$, Fig. 9. The openings in the pipe $a$ are then sealed in any known manner—for example, by means of caps $a'$. The lining is then subjected to internal hydrostatic pressure, and I regard the pressure of steam and gases as embraced by the term "hydrostatic." This result may be accomplished by forcing water into the closed pipe $a$ through a pipe $f$ by means of a pump, as $l$. A gage, as $i$, may be used in this connection for indicating the degree of pressure employed. While the described pressure is being applied, heat is also applied at a suitable point—for example, by means of a device indicated at $k'$. Such application of heat and pressure causes the lining $n$ to yield to the pressure first at a predetermined point, as shown in Fig. 15, and then from such point outward toward the ends of the pipe $a$, so that air is expelled from between the pipe and its lining, and a good fit is thus insured. The substance introduced to create pressure within the lining, as described, if heated softens the lining, and thus causes it to yield more readily to the pressure, so that it is forced thereby into intimate contact with the pipe. The described application of heat and pressure is adapted to both straight and curved pipes. In the case of branched pipes—such, for example, as are shown in Fig. 1—I carry the lining around the union of the branches with pipe as follows: Referring to Fig. 12, a branch is indicated at $a^2$, and this branch is not closed during the application of heat and pressure, as described, so that the lining under these influences is, as it were, blown outward past, through, or around the union of the pipe and branch. The projection or pocket $a^3$ thus formed is opened and expanded, so as to lie against the walls of the branch $a^2$. This is illustrated in Fig. 13. If necessary, a short length of pipe, as $a^4$, is used to line the rest of the branch, and the part $a^4$ is burned to the main lining—for example, as indicated at $a^5$. No solder need be employed and the burned joint can be conveniently made because branches are usually quite short, and it does not in any way detract from the practical continuity of the lining. To carry the lining of the pipe past, through, or around the unions of the pipe with its branches is important for several reasons. It would be very difficult to burn a joint on the line of union because of its peculiar shape and because it is difficult to get access to it, and the lines of union are points most exposed to corrosion and the like, so that continuity of the lining at these points is advantageous. Moreover, relative differences of sizes in diameter are unimportant, because that portion of the lining which is blown into the branch necessarily adapts itself to the size thereof.

From the foregoing description it will be apparent how any irregular shape may be lined. For example, on Sheet 1 I have indicated by lines $a^5$ the location of the burned joints, and from their location it will be understood how the lining of the main pipe is blown into the branches. If desired, the rope $m$ may be provided with a comparatively large part, as $m'$, which in passing through the pipe tends to smooth the lining. The completed lining may be smoothed, finished, and polished by causing suitable objects, as metallic balls and the like, to traverse the pipe.

It is well known to those skilled in the art to which my invention relates that pipes are wrought into all kinds of shapes appropriate to the situations and purposes required and that such pipes are made of various kinds of metal and are used in the manufacture of chemicals and in kindred ways; but no matter of what metal they are constructed and to what purpose applied and whenever the necessity for the presence of a lining arises—for example, to prevent galvanic or chemical action—use may be advantageously made of my invention, and by my invention a suitable thickness of lining may be applied and it is greatly needed in the case of bilge, suction, feed, and other pipes used upon shipboard and subjected to the action of sea and bilge waters. Pipes of my invention are even throughout and do not vary in thickness. At the same time they are very strong at the base of the branches because of the continuity of the lining at such points, and the two metals are as nearly homogeneous as possible, and all indentations in the interior walls of the pipe are filled with the lining, so that the interior of the pipe and its branches is smooth. Worn and leaky pipes may be repaired by lining them in accordance with my invention, and such lining materially increases their strength and resistance to pressure from within. In new work comparatively thin pipes of copper can be lined, so that a saving of copper, which is an expensive metal, is effected while the requisite strength of pipe is insured by the presence of the lining.

From the foregoing it is obvious that the application of heat and pressure operates to soften and otherwise prepare the lining, so that by the pressure it is firmly attached to the pipe, caused to conform to its contour, and carried through, round, and past the unions of branches when present. The expansion and contraction of the pipe itself also operates to insure a tight fit between the pipe and lining.

It will be obvious to those skilled in the art to which my invention appertains that modifications may be made in details without departing from the spirit thereof. Hence I do not limit myself to the precise construction and arrangement of parts hereinabove set forth and illustrated in the accompanying drawings; but,

Having thus described the nature and objects of my invention, what I claim as new, and desire to secure by Letters Patent, is—

1. The process of lining pipes which consists in inserting a tubular lining of comparatively soft metal, applying heat to soften the lining at or near the center of the pipe, and applying pressure within the lining to cause it to expand first at or near the point so softened and subsequently outward toward the end of the pipe, substantially as described.

2. The process of lining curved pipes which consists in inserting a tubular lining of comparatively soft metal through the end of the pipe, and applying heat near the center of the curve to soften the lining to facilitate its travel through the curved portions of the pipe, substantially as described.

In testimony whereof I have hereunto signed my name.

JOHN T. HINDS.

In presence of—
W. J. JACKSON,
K. M. GILLIGAN.